United States Patent [19]

Kato

[11] Patent Number: 4,862,195

[45] Date of Patent: Aug. 29, 1989

[54] OVERCOATING LAYER FOR THERMAL PRINTING HEAD

[75] Inventor: Masakazu Kato, Furukawa, Japan

[73] Assignee: Alps Electric Co., Ltd., Tokyo, Japan

[21] Appl. No.: 129,649

[22] Filed: Dec. 7, 1987

[30] Foreign Application Priority Data

Mar. 5, 1987 [JP] Japan .................................. 62-50939

[51] Int. Cl.[4] .............................................. G01D 15/10

[52] U.S. Cl. ................................ 346/76 PH; 219/216; 480/120

[58] Field of Search ............. 346/76 PH; 219/216 PH

[56] References Cited

FOREIGN PATENT DOCUMENTS 0004077 1/1985 Japan .

0090260 4/1987 Japan .

2097204 5/1987 Japan .................................. 219/216

OTHER PUBLICATIONS

F. C. Hess, "Chemistry Made Simple", 1955, p. 166.

*Primary Examiner*—C. L. Albritton
*Assistant Examiner*—Huan H. Tran
*Attorney, Agent, or Firm*—Guy W. Shoup; Paul J. Winters

[57] ABSTRACT

A thermal head having an overcoating layer formed by a material in which a metal element is added to a sialon. The sialon is silicon (Si)-aluminum (Al)-oxygen (O)-nitrogen (N) compound. Thus, the thermal head can print at a high speed, increase its printing life and provide stable printing life.

1 Claim, 1 Drawing Sheet

OVERCOATING LAYER FOR THERMAL PRINTING HEAD

BACKGROUND OF THE INVENTION

1. Field of the Invention

This invention relates to a thermal head used for a thermosensitive printer, thermal transfer printer, etc.

2. Description of the Prior Art

FIG. 1 shows an example of a conventional thermal head. In the thermal head of this example, a glass glazed layer 2 is formed partly on an insulating substrate 1 made of alumina, a heat generating resistor layer 4 and a power supply conductor layer 5 are sequentially laminated through an undercoating layer 3 on the glazed layer 2 so that the power supply conductor layer 5 is patterned in an individual electrode 5*a* and a common electrode 5*b*. The heat generating resistor layer 4 is exposed in a gap between the individual electrode 5*a* and the common electrode 5*b* to form a heat generating portion A. The surface of this thermal head is protected by an overcoating layer 6.

The overcoating layer 6 prevents the heat generating resistor layer 4 from being oxidized and the heat generating portion A from being damaged.

Heretofore, it has been proposed to use as the material for forming the overcoating layer 6 a silicon-aluminum-oxygen-nitrogen compound (hereinafter referred to as "a sialon").

The sialon has 9 to 10 of high Mohs hardness, excellent wear resistance, and a film formed of the sialon has an oxidation preventiveness. Thus, the overcoating layer 6 may be formed only of the sialon film to reduce the thickness of the overcoating layer 6. Further, the sialon has excellent thermal conductivity. Thus, the thermal head in which the overcoating layer 6 is formed of the sialon has good thermal responsiveness. In addition, since the sialon film has excellent thermal impact resistance, the thermal head can cope with high speed printing.

However, such a thermal head has poor bondability of the heat generating resistor layer 4 and the overcoating layer 6 in the heating portion A due to fusion-bonding resistance of the sialon; and if a hard foreign material causes the overcoating layer 6 to crack in case of printing, the overcoating layer 6 is exfoliated from the cracked portion, the adjacent heat generating resistor layer 4 is rapidly oxidized, which increases the resistance value. As a result, the heat generation amount is markedly reduced, to such an extent that printing becomes impossible. Thus, the printing life of such a thermal head is limited.

SUMMARY OF THE INVENTION

Accordingly, an object of this invention is to provide a thermal head which can overcome the abovementioned drawbacks and which can print at a high speed, offer increased printing life and provide stable printing life.

The word "sialon," as used here, refers to a silicon (Si)-aluminum (Al)-oxygen (O)-nitrogen (N) compound. The overcoating layer, formed of a material in which the metal element is added to the sialon, has good bondability to the heat generating resistor layer 4 in FIG. 1 of the thermal head; even if a foreign material is encountered during printing and causes the overcoating layer 6 to crack, exfoliation of the overcoating layer is minimal.

Suitable metal elements that may be added to the sialon include high melting point metals, highly conductive metals, rare earth metals, etc. The high melting point metals, having melting temperatures of 1600° C. or higher, include chromium (Cr), molybdenum (Mo), tungsten (W), vanadium (V), niobium (Nb), tantalum (Ta), titanium (Ti), zirconium (Zr), hafnium (Hf), etc. Suitable highly conductive metals preferably utilize metals having specific resistance of 15 microohms-cm or less, such as Copper (Cu), nickel (Ni), palladium (Pd), magnesium (Mg), etc. Suitable rare earth metals preferably utilize yttrium (Y), lanthanum (La), cerium (Ce), samarium (Sm), etc. These metal elements may be used individually or may be simultaneously used in mixture thereof.

The amount of the metal element to be added to the overcoating 6 in FIG. 1 is preferably 0.5 $\pm$10 atomic percent of the sialon to which the metal element is added. If the added amount of the metal element is less than, substantially 0.5 percent the bondability of the overcoating layer cannot be sufficiently improved. If the added amount of the metal element exceeds substantially 10 percent, the hardness of the overcoating layer 6 decreases and the durability of the thermal head deteriorates.

The overcoating layer 6 of the thermal head of this invention may be produced by a sputtering method, a deposition method, etc.

The sputtering method can be dipole sputtering, reactive sputtering, or high frequency magnetron sputtering.

The overcoating layer 6 is formed by sputtering of metal, metal oxide or metal nitride onto a sialon target. is in a pellet shape, it is convenient to handle it.

The overcoating layer may also be formed by simultaneously sputtering metal, metal oxide, or metal nitride on a target made of sialon.

When forming the overcoating layer 6 by the sputtering method, argon gas, a mixture of argon and oxygen, or a mixture of argon and nitrogen may be used as a carrier gas.

The overcoating layer 6 may also be formed by deposition, utilizing various material heating approaches, such as resistance heating deposition, high frequency heating, etc.; electron beam heating may be used for materials that cannot be mixed in a crucible.

The overcoating layer 6 may be formed by depositing material prepared by first uniformly mixing powder of metal, metal oxide or metal nitride and powder of sialon as the deposition material. These materials are mixed in a suitable ratio of metal powder to sialon powder to produce the desired composition of the overcoating layer 6.

The deposition material may be conveniently handled in tablet shape.

The thermal head of this invention may also be produced by simultaneously depositing the deposition material of metal, metal oxide or metal nitride and sialon in separate crucibles in the same vacuum tank.

The above and other related objects and features of the invention will be apparent from the following description and the accompanying drawings, and the novelty thereof is pointed out more particularly in the claims.

DESCRIPTION OF THE PREFERRED EMBODIMENTS

Examples of a thermal head according to the present invention are described in detail with reference to the accompanying drawings.

EXAMPLE 1

Figure 1:
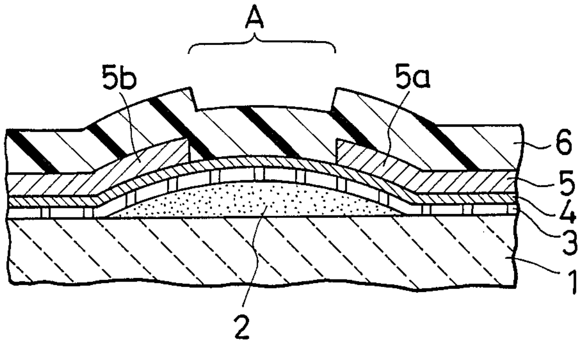
PRIOR ART FIG. 1
FIG. 1 is a sectional view showing a substantial part of one example of a conventional type of thermal printing head.

With reference to FIG. 1, a thermal head was produced by forming a glass glazed layer 2 having thickness substantially 40 microns on an insulating substrate 1 made of alumina, and then forming an undercoating layer 3 thereon having thickness substantially 0.3 micron of a tantalum pentaoxide film. A heat generation resistor layer 4 having thickness substantially 0.05 micron made of a tantalun-chromium-nitrogen compound and a power supply conductor layer 5 having thickness substantially 1.5 microns and made of aluminum were sequentially formed on the undercoating layer 3; and an overcoating layer 6 having thickness substantially 4 micron was then formed thereon.

This overcoating layer 6 is formed of a material in which a metal was added to the sialon. In this example, the metal was chromium, and the added amount of chromium was 1–5 atomic percent.

A method for manufacturing thermal head is now described.

To manufacture the thermal head, a high frequency magnetron sputtering apparatus is preferably used.

A composite target, a pellet of chromium placed on a sialon target, was set in a high frequency magnetron sputtering apparatus. Then, an insulating substrate 1 formed with the power supply conductor layer 5 as fed into the sputtering apparatus, argon gas was supplied at a flow rate of 25 SCCM into the sputtering apparatus, the substrate was heated to 250° C., and high frequency power of 8 W/cm$^2$ was then applied. Then the overcoating layer 6 made of sialon and chromium was formed.

The thermal head of this example 1 was tested for printing durability. The test was executed for two apparati, which are referred to as "example 1A" and "example 1B". For comparison, two thermal heads in which the overcoating layer 6 was formed only of the sialon were used in a similar test; these are referred to as "conventional example A" and "conventional example B". The thicknesses of the overcoating layers 6 of the conventional examples A, B were 4 microns. The conventional examples and the examples 1A and 1B have the same structure, except for the overcoating layer 6.

In the printing durability test, the variation in the resistance value of th head was examined as the feeding distance was extended for the embodiments of examples 1A and 1B. The results are shown in FIG. 2, where the feeding distance indicated on its abscissa axis is relative.

Figure 2:
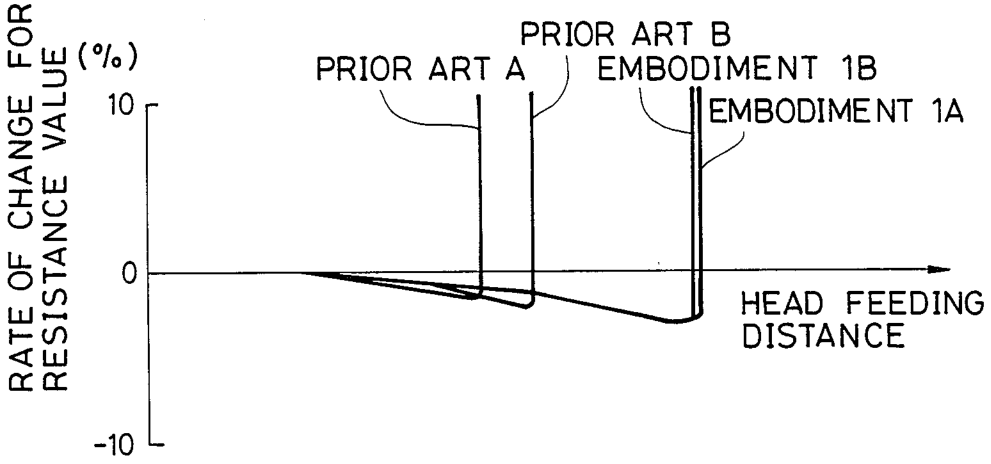
FIG. 2 is a graph showing the relationship between a head feeding distance and a rate of change for a resistance value examined in an example 1.

From the results in FIG. 2, the lives of each of the thermal heads of the conventional examples A, B of the prior art are seen to be short and the difference of the lives of the two prior art examples is large; but the lives of the thermal heads of the examples A, B are longer and are substantially equal.

EXAMPLE 2

A thermal head similar to that in example 1 was produced by adding different metal elements to the sialon, and the bondability and the Mohs hardness of the overcoating layer 6 (FIG. 1) of the thermal heads were examined. The added metal element was selected from among chromium, molybdenum, tantalum, yttrium, and copper. The thermal heads were produced by the same steps as those of the example 1. The added amounts of the metal elements to the overcoating layers 6 of the thermal heads were 1–5 atomic percent of the initial sialon.

The bondability was evaluated as indicated below. The diamond processor of a Microvickers hardness meter was pressed under a load of 1 kg into the overcoating layer 6 on the heating generating portion or gap A of the thermal head. This operation was executed for a number of heat generating portions A. The presence or absence of exfoliation of the overcoating layers 6 of the heating generating portions was observed, and the exfoliation rate, if any, was noted.

For comparison, the thermal heads of the conventional example, in which the overcoating layer 6 is made of sialon to which a metal element was not added, was formed and similarly tested. The results are shown in Table 1.

TABLE 1

| Added element | Exfoliation rate | Mohs hardness |
|---|---|---|
| None (Conv. Ex.) | 20% | 9–10 |
| Chromium | 0 | 9–10 |
| Molybdenum | 0 | 9–10 |
| Tantalum | 0 | 9–10 |
| Yttrium | 0 | 9–10 |
| Copper | 0 | 9–10 |

As indicated in Table 1, the thermal head of the conventional example, in which the overcoating layer 6 included only the sialon to which no metal element was added, exhibited 20 percent exfoliation rate; the bondability of the overcoating layer 6 is poor. The thermal head formed according to this invention, in which the overcoating layer 6 is formed of sialon to which a metal element was added, exhibited no exfoliation of the overcoating layer 6, and the bondability of the overcoating layer 6 was acceptable.

Where the thermal head of this invention is formed in the overcoating layer 6 according to this invention, the overcoating layer is rigidly bonded to the heat generating resistor layer as desired; the overcoating layer 6 of this invention does not exfoliate, even if a foreign material is encountered in printing and causes the overcoating layer to crack; and the heat generating resistor layer is effectively protected against the atmosphere.

Further, the overcoating layer 6 of the thermal head of this invention preserves other merits of the sialon overcoating layer, such as excellent oxidation resistance, thermal impact resistance, thermal conductivity and high hardness.

Therefore, the thermal head of this invention can print at a high speed and provide long and stable printing life.

What is claimed is:

1. A protective layer for a thermal printing head, the layer comprising a compound of silicon, aluminum, oxygen and nitrogen to which a metal or mixture of metals is added in a concentration of substantially 1–5 atomic percent, with the metal to be added being selected from a group consisting of chromium, molybdenum, tungsten, vanadium, niobium, tantalum, titanium, zirconium, hafnium, copper, nickel, palladium, and magnesium.

* * * * *